United States Patent Office 3,508,471
Patented Apr. 28, 1970

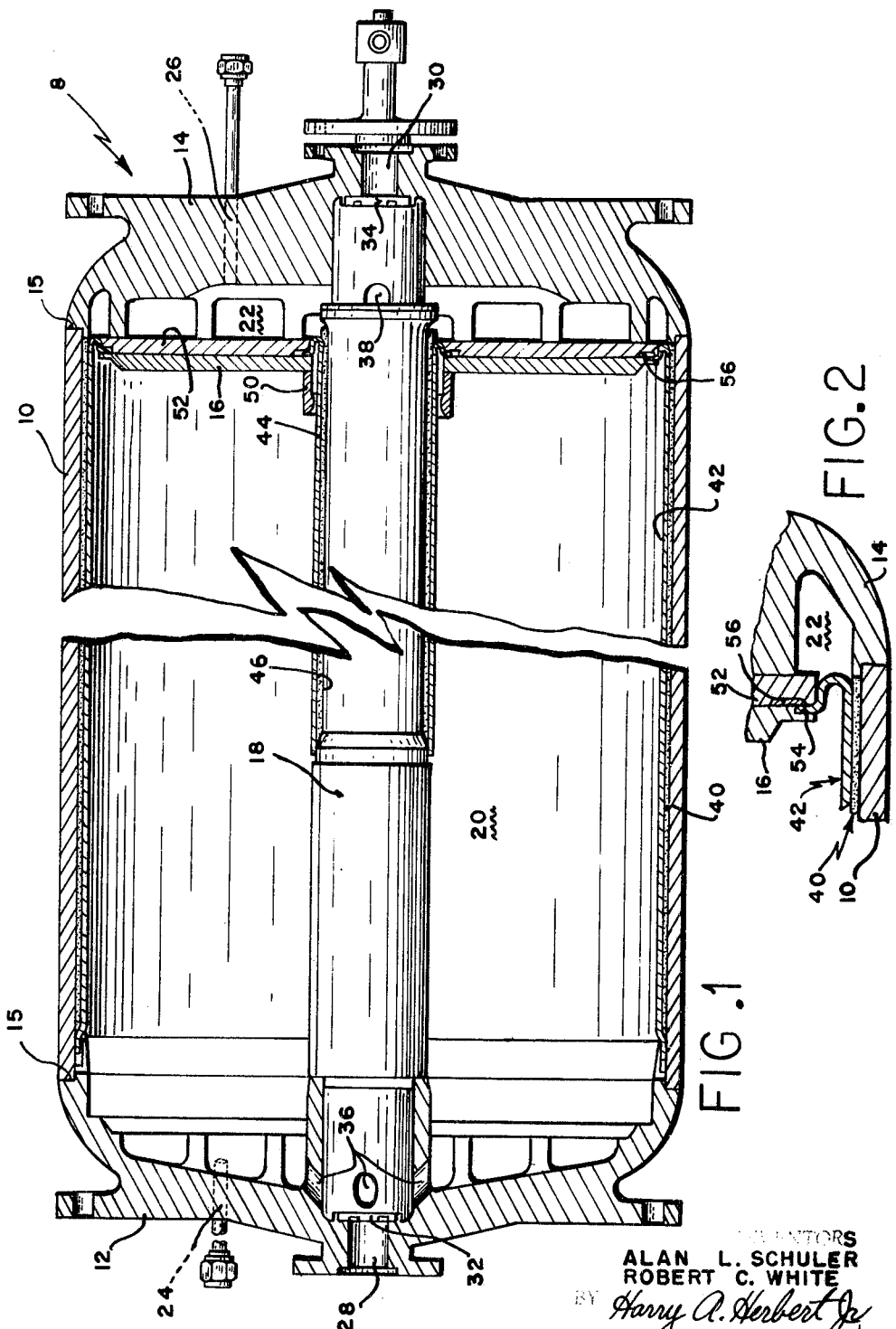

3,508,471
ROLLING METAL DIAPHRAGM
Alan L. Schuler and Robert C. White, San Diego, Calif., assignors to the United States of America as represented by the Secretary of the Air Force
Filed Sept. 11, 1968, Ser. No. 759,155
Int. Cl. F04b 17/00
U.S. Cl. 92—98                    2 Claims

ABSTRACT OF THE DISCLOSURE

A rolling diaphragm in a positive expulsion device which provides metal between the extrusion medium and the pressurant. One fluid is positively expelled when pressurized by another fluid while the two fluids are kept entirely separate. A special guide collar is provided for insuring smooth travel of the rolling diaphragms. A special bond is provided for the flexible sleeve to prevent it from buckling and provide smooth operation.

BACKGROUND OF THE INVENTION

The invention relates to rolling diaphragm devices, and more particularly, to devices which include a movable piston operated by a fluid under pressure and which positively expel a second fluid, the two fluids being maintained entirely separate.

SUMMARY OF THE INVENTION

An annular piston is sealed to a thin metallic sleeve or diaphragm at its inner and outer circumferential edges. The inner sleeve surrounds the central guide post. Both sleeves roll back upon themselves as the piston traverses the distance between the ends of the enclosing cylinder. The cylinder wall is lined, and the central guide post is covered with a bonding of silicone rubber. This provides both a lining for the chamber 22, and a temporary bond for the metallic diaphragm which prevents buckling and insures smooth rolling.

The object of the invention is to provide rolling diaphragms for a positive expulsion device which provides complete separation between a medium being expelled and a pressurant.

A further object of the invention is the provision of a device for expelling one fluid when pressurized by another fluid while keeping the two fluids separated and out of contact with each other.

A further object of the invention is the provision of means in the form of a guide sleeve secured to the interior circumference of the piston for effecting smooth travel of the piston.

DESCRIPTION OF THE DRAWING

FIGURE 1 is a longitudinal cross-sectional view; and
FIGURE 2 is an enlarged view of the attachment of the sealing connection of diaphragm and piston.

DESCRIPTION OF THE PREFERRED EMBODIMENT

The completed assembly is designated by numeral 8. It comprises a cylinder 10 secured to bulkheads 12 and 14 by an electron beam weld at 15 or any other expedient securing means. The area within the cylinder is divided by an annular piston 16 mounted on a central post 18. The piston moves in the separated areas or chambers 20 and 22. The fluid being expelled occupies the area 20 and the pressurant moving the piston occupies the area 22.

The chamber 20 is first evacuated through the duct 24, then the fluid to be extruded is introduced into the chamber 20 through the same duct 24. Evacuation of the chamber 22 takes place through duct 26. Pressurant is introduced through duct 30, enters the chamber 22 through opening 38 and, when sufficient pressure is built, moves the piston 16 to the left, as shown in FIGURE 1, thereby expelling the material in the chamber 20, through openings 36 and extrusion outlet 28. Rupture discs 32 and 34 close the chambers 20 and 22, respectively, until predetermined pressures are reached.

The rolling diaphragm is an all metal assembly comprising an outer sleeve 42 and inner flexible diaphragm or sleeve 44. The diaphragms 42 and 44 are secured to the piston 16 by welding and each rolls with the piston as it moves toward the extrusion outlet 28. A bonding 40 of silicone rubber or other similar bonding lines the tank wall 10. The temporary adherence of thin metallic sleeve 42 to the silicone rubber bonding prevents it from buckling under the pressure it sustains from the movement of the piston 16, and it is allowed to roll smoothly with the piston toward the liquid outlet 28.

The inner post 18 is provided with a silicone rubber covering 46 which serves in the same manner to provide smooth rolling of the inner diaphragm 44. In practice the silicone rubber bonding 40 and 46 may split, adhering both to wall 10 and post 18 and to the diaphragms 42 and 44. A guide sleeve 50 is secured to the inner circumference of the piston 16 on the extrusion side to prevent binding or cocking of the piston 16 on the post 18 and to insure its smooth travel.

An essential element of the invention resides in the character of the seal and the attachment of the rolling diaphragms 42 and 44 to the piston element 16. A back plate 52 is secured to the piston 16. The end of the flexible diaphragm 42 is seated in an annular recess 54 in the piston 16 and is welded or secured by other expedient means. A recess 56 may be filled with bonding compound and thus accommodate any excess bonding material.

The inner diaphragm 44 is secured to the inner periphery of the piston 16 in the same fashion.

Although the invention has been described with reference to a particular embodiment, it will be understood to those skilled in the art that the invention is capable of a variety of alternative embodiments within the spirit and scope of the appended claims.

What is claimed is:
1. In a positive expulsion device a casing, means for separating the area within said casing into two variable areas, an extrusion area and a pressure area, said means comprising an annular piston movable within said casing and mounted on a central post for movement with respect thereto, an outer flexible metallic sleeve secured at one of its ends to the exterior periphery of said piston, a second flexible metallic sleeve secured at one of its ends to the inner periphery of said piston, said second sleeve surrounding said central post, said sleeves being capable of rolling back upon themselves as the piston progresses toward the extrusion end, said device being capable of receiving extrusion material in the extrusion area, and expelling it under pressure through an expulsion opening and capable also of receiving compressant material under pressure for moving said piston and expelling said extrusion material, and a silicone rubber lining element applied to adhere to the interior of said casing and to lie between said casing and said first mentioned flexible sleeve, a silicone rubber covering element applied to adhere to said central post and to lie between the surface of said post and said second flexible sleeve, said silicone rubber elements providing a temporary bond for said flexible sleeves to insure smooth rolling thereof.

2. In a device as claimed in claim 1, a guide collar secured to said piston on the extrusion side of said piston and surrounding said central post for providing smooth travel of said piston.

References Cited

UNITED STATES PATENTS 2,692,618   10/1954   Ludowici.
2,781,784   2/1957    Baker.

ROBERT M. WALKER, Primary Examiner

U.S. Cl. X.R.

74—18.2; 92—103, 107, 170; 417—395, 566